March 15, 1966     M. COHEN     3,239,902

SPRING CLIP AND BOOT THEREFOR

Filed Jan. 22, 1964

INVENTOR.
Maurice Cohen
BY
Salter & Michaelson
Attorneys.

United States Patent Office 3,239,902
Patented Mar. 15, 1966

3,239,902
SPRING CLIP AND BOOT THEREFOR
Maurice Cohen, Coral Gables, Fla.
(3580 NW. 52nd St., Miami, Fla.)
Filed Jan. 22, 1964, Ser. No. 339,489
5 Claims. (Cl. 24—137)

The present invention relates to a spring clip and to a boot for use therewith. More particularly, the present invention relates to a spring clip for use in suspending an article for display therefrom.

The spring clip embodied in the present invention has particular application in a display device or rack that includes a plurality of horizontal hangers or rods. Such a device has normally been utilized heretofore for the display of skirts or rugs or any other article that may be displayed in a suspended position. Prior to the instant invention it has been the practice to suspend skirts, rugs or the like for display from a horizontal hanger or rod by the use of spring clips that were preassembled on the horizontal rod. The preassembly of the spring clips on the horizontal hanger was necessary since the horizontal hanger usually included ends that were closed in the final assembly of the hanger on a display rack. Further, since the prior known spring clips included elements that were formed with ears having rod receiving openings, it was not possible to thread the hanger or rod through the openings once the hanger was mounted in position on a display device. Thus, in the prior constructions the end of the hanger was usually threaded through the openings in the ears of the elements to mount the spring clips in proper position on the hanger, after which the hanger was then assembled on its display rack. Since these prior known spring clips did require the preassembly thereof on a horizontal hanger before the mounting of the hanger on the display rack, rearranging of the clips or removing them from their horizontal hanger necessitated the disassembly of the hanger from the display rack on which the hanger was mounted. This disassembly operation was oftentimes impractical and awkward to achieve, and, accordingly, once the spring clips were mounted in position on their horizontal hanger, they were usually allowed to remain in their assembled position.

In some forms of display devices, such as rug display racks, it is necessary to employ a heavy-duty hanger because of the weight of the rugs that are suspended from the hangers. Normally, truss-type hangers are employed in such display rack constructions, and in the prior known truss-type hanger constructions for use in the display of rugs, the spring clips necessarily had to be preassembled on the horizontal portion of the hangers before the intermediate truss elements were secured in place. On many occasions, it has been found that additional spring clips would be helpful in suspending the rugs in the display position thereof; however, because of the limitations of the spring clips already having been preassembled on these prior-known truss-type hangers, it was not practical to mount the additional spring clips in position.

The present invention defines a unique form of spring clip construction, wherein the spring clip may be assembled on a horizontal rod or hanger after the hanger has been mounted in place on a display rack or the like. In order to avoid the requirement of preassembly of the spring clip, as was previously known heretofore, the spring clip embodied herein includes clip elements that are formed with fingers that define open slots through which the horizontal rod of the hanger extends. In order to lock the fingers of the spring clip on the horizontal rod, a unique spring element is provided that cooperates with the clip elements to lock the clip elements in their assembled position. Thus, the spring element is assembled in place and cooperates with the fingers of the clip elements to securely lock the spring clip construction on the horizontal rod of a hanger. Unlike the prior known constructions, the present invention may be disassembled from the rod on which it is mounted at any time, or may be assembled in place as desired or required by the type of article to be displayed.

Accordingly, it is an object of the present invention to provide a spring clip construction that may be assembled or disassembled from a horizontal rod of a hanger that is located on a display rack or the like without the requirement of disassembling the hanger from the rack.

Another object of the invention is to provide a spring clip construction that includes a pair of clip elements that are secured in place on a hanger by a spring element, the spring element being removable from the assembled position thereof when the spring clip is to be disassembled from its mounted position.

Still another object is to provide a spring clip that may be installed on a hanger with formed or closed ends without the requirement of dissassembling the hanger from its mounted position.

Still another object is to provide a spring clip that includes a spring element that cooperates with fingers that are formed as part of the spring element to secure the spring element in position on a hanger.

Still another object is to provide a boot for use in a spring clip construction that may be mounted in the assembled position thereof without the use of fastening elements.

Still another object is to provide a spring clip that is defined by spring biased elements, on the ends of which removable tips or boots are assembled.

Other objects, features and advantages of the present invention will become aparent as the description thereof proceeds when considered in connection with the accompanying illustrative drawings.

In the drawings which illustrate the best mode presently contemplated for carrying out the present invention:

Figure 1:
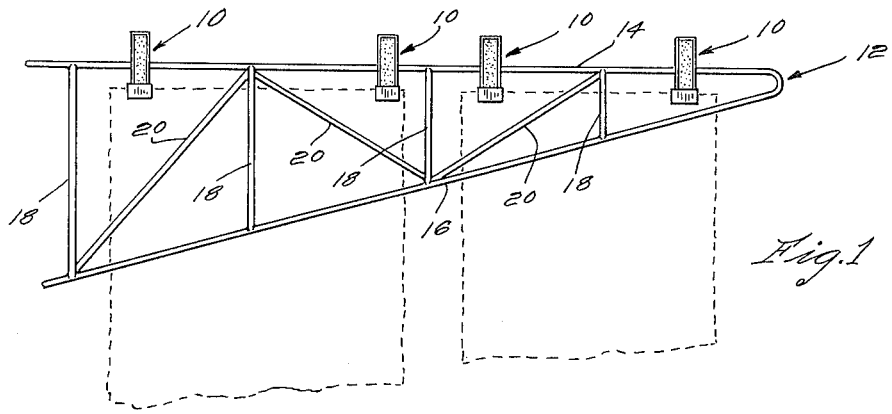
FIG. 1 is an elevational view of a truss-type hanger showing the mounting of a plurality of spring clips of the present invention.
Figure 2:
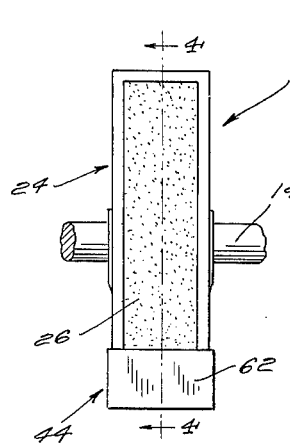
FIG. 2 is an elevational view of one of the spring clips embodied in the present invention and showing the mounted position thereof on a horizontal rod.

Referring now to the drawings and particularly to FIG. 1, a plurality of spring clips generally indicated at 10 are shown mounted on a hanger generally indicated at 12, the hanger 12, in turn, being mounted on a display rack (not shown) of conventional construction. For purposes of illustration, the hanger 12 is shown as a truss-type hanger that is normally utilized in the display of heavy articles, such as rugs, or the like. As shown, the hanger 12 includes a horizontal bar or rod 14 joined at the outermost end thereof to an inclined rod 16, the rods 14 and 16 being secured at the inner ends thereof to the display rack for pivotal movement thereon. Since the hanger 12 has been described as the truss-type for use in the display of articles such as rugs, intermediate vertical members 18 are provided that interconnect the rods 14 and 16. Diagonal members 20 also interconnect the rods 14 and 16 and cooperate with the vertical members 18 to form a relatively rigid hanger construction. It is understood, of course, that other hanger constructions may be utilized with the present invention, the hanger, per se, forming no part of the invention and only providing a means on which the spring clip is mounted.

Referring now to FIGS. 2 through 8, one of the spring clips 10 is illustrated and includes a pair of clip elements generally indicated at 22 and 24 that are adapted to be mounted for biased pivotal movement on the horizontal rod 14. The clip elements 22 and 24 are formed substantially identical and are interfitted in a manner to be described, to define a device for effectively retaining articles in suspended position therefrom. In order to better describe each of the clip elements 22, 24, reference is made to FIG. 5 wherein one of the clip elements is arbitrarily designated at 22. It is understood that the other clip element 24 is constructed identically to the clip element 22.

Figure 5:
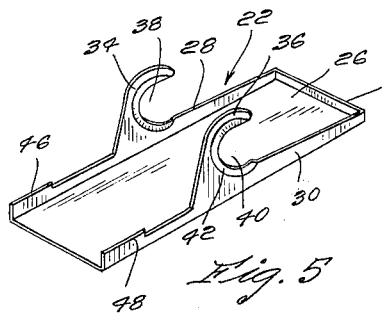
FIG. 5 is a perspective view of one of the spring elements of the spring clip embodied herein showing the inner surfaces and spring fingers thereof.

The clip element 22 includes a relatively flat rectangularly shaped body portion 26 to which marginal side walls 28 and 30 are joined. A marginal end wall 32 is also joined to the body portion 26, but it will be observed that the end of the body portion 26 opposite the end wall 32 does not have a marginal wall joined thereto, the purpose of which will be described hereinafter. As seen in FIG. 5, the marginal side walls 28 and 30 and the marginal end wall 32 cooperate with the body portion 26 to define a channel. Formed integrally with the marginal side walls 28 and 30, respectively, are fingers 34 and 36, the fingers 34 and 36 being curved in configuration and being spaced from their associated marginal walls 28, 30 to define open-ended slots 38, 40. Since the fingers 34, 36 are interfitted in frictional engagement in the assembled position of the spring clip elements 22, 24, as will be described hereinafter, bearing depressions that are generally concave in configuration are provided. One of such bearing depressions is indicated at 42 in FIG. 5, it being understood that the bearing depression formed on the opposite spring finger 34 is similarly located and shaped.

In the assembled position of the clip elements 22, 24, the end of the body 26 that is adjacent the marginal end wall 32 will be grasped by the user and this portion is thus referred to as a handle portion. Conversely, the opposite end of each clip element is normally in biased engaging relation with the same end of the other element and this portion will be referred to as a jaw portion. As will be described hereinafter, the jaw portion of each clip element is adapted to have a tip or boot generally indicated at 44 mounted thereon and in order to firmly retain the boot 44 in position, the marginal side walls 28 and 30 of each clip element are formed with projections 46, 48 respectively that are located adjacent the open side of the channel as defined by the marginal side walls 28, 30 and the marginal end wall 32.

Figure 3:
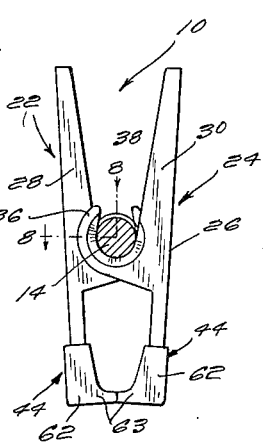
FIG. 3 is an end elevational view of the spring clip shown in FIG. 2.
Figure 4:
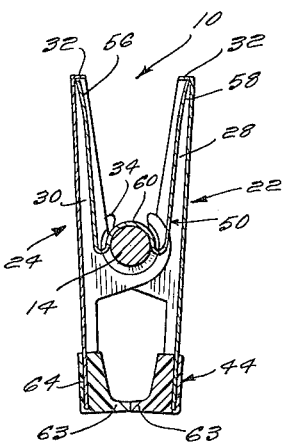
FIG. 4 is a sectional view taken along lines 4—4 in FIG. 2.

As will be observed in FIGS. 3 and 4, the spring fingers 34 and 36 that define the open slots 38 and 40 receive the horizontal rod 14 within the open slots. However, since the lateral dimension of the open slots 38 and 40 enable the rod 14 to be freely received therein, an additional locking means is necessary in order to secure the clip elements 22 and 24 in biased relation on the horizontal rod 14. Such a locking means is defined by a spring element generally indicated at 50 and illustrated in FIG. 6. The spring element 50 includes opposed arms or wings 52 and 54 that extend generally outwardly with respect to each other and that terminate in offset end portions 56 and 58, respectively. Joined to the arms or wings 52 and 54 is an intermediate or central arcuate portion 60 that has an inner curvature that generally corresponds to the curvature of the rod 14. As will be seen in FIG. 4, the central arcuate portion 60 is adapted to overlie the upper portion of the rod 14 in engaging relation therewith and cooperates with the wings 52, 54 to lock the clip elements 22 and 24 on the rod 14. It is further seen that the lateral dimension of the wings 52, 54 and the central arcuate portion 60 of the spring element 50 are proportioned for being received within the channel defined by the marginal walls of each of the clip elements.

Contrary to the construction of the spring clips known heretofore, it is not necessary that the clip elements 22 and 24 and the spring element 50 is preassembled on the bar 14 of the hanger 12 prior to the securement of the hanger on its rack or support. Thus, the spring clip 10 of the present invention has the advantage of being assembled at any time and at any point on the rod 14 after the rod it mounted for pivotal movement on its support. In order to effect the assembly of the clip elements 22 and 24 on the bar 14, the clip elements are positioned as shown in FIGS. 3 and 4 with the rod 14 received within the open slots of the fingers 34 and 36 of each clip element. The sides of the fingers 34 and 36 of the clip element 22 are nested within the corresponding sides of the fingers 34, 36 of the clip element 24 and since each of the fingers formed on the clip elements is provided with a bearing depression 42 on the outer side thereof the clip elements are properly oriented with respect to each other, and are freely pivotal with respect to each other on the rod 14 that extends through the slots 38, 40 of each of the clip elements. In order to secure the clip elements 22, 24 in their assembled position on the rod 14, the spring element 50 is provided and, as shown in FIG. 4, is mounted such that the central arcuate portion 60 overlies the adjacent surface of the rod 14. With the opposed wings 52 and 54 located within the channel of each of the clip elements, the ends 56 and 58 of the spring element wings are snapped into engaging relation with the adjacent marginal end wall 32 of the associated clip element. The arcuate configuration of the central portion 60 of the spring element 50 enables the wings 52 and 54 to be properly biased to enable the ends 56, 58 to snap against the marginal end wall 32 of each of the associated clip elements and it is seen that it is only necessary to exert a sufficient downward force on the central arcuate portion 60 of the spring element 50 to cause the ends 56, 58 of the wings 52, 54 to snap within their respective channels to the assembled position thereof.

With the spring element 50 mounted in position as shown in FIG. 4, the clip elements 22 and 24 are assembled on the rod 14 in pivotal relation and the jaw portion of a clip element on which a boot 44 is mounted cooperates with the jaw portion of the opposed clip element on which a boot 44 is mounted to define an effective gripping means. The handle portions of the clip elements which extend upwardly of the rod 14 are easily accessible and may be grasped and urged inwardly to force the jaw portions of the clip elements apart when it is necessary to insert an article therebetween or to remove the article therefrom. The fingers 34, 36 of the clip elements also cooperate to retain the elements on the rod 14 in the assembled position thereof. As shown in FIGS. 3 and 4, the fingers overlap to narrow the slots defined by the fingers and thus effectively locks the clip elements on the rod. By reducing the slot area with the overlapping fingers, the rod is also prevented from slipping out of the slots during the assembly operation.

Figures 6, 7:
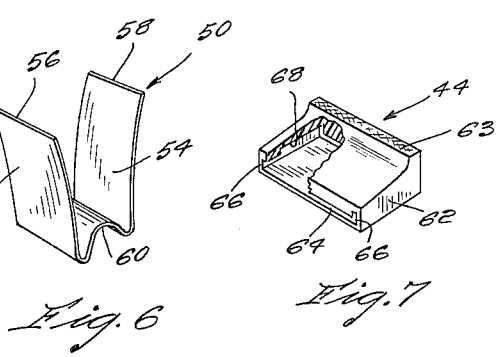
FIG. 6 is a perspective view of the spring element that is formed as part of the spring clip of the present invention.
FIG. 7 is a perspective view with parts broken away and shown in section of the boot that is applied to each of the spring elements of the spring clip.
Figure 8:
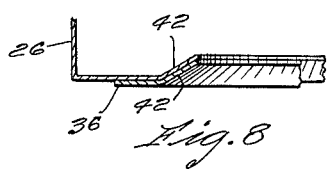
FIG. 8 is a sectional view taken along lines 8—8 in FIG. 3.

As mentioned hereinabove, the boots 44 are insertable on the lower jaw portions of the clip elements 22 and 24 to define gripping means that interact to retain an article therebetween. As shown in FIG. 7, each of the boots 44 includes an integrally molded one-piece member that includes a body 62 that terminates in a toe portion 63. The body 62 is formed with a slot 64 that extends therein and communicating with the slot 64 at the sides thereof are channels 66 that cooperate with the slot 64 for receiving the body portion 26 and the marginal walls 28 and 30 of a clip element. It is understood that the end of the body portion 26 adjacent the projections 46 and 48 is not formed with a marginal end wall, this construction enabling the boot 44 to be slipped into engaging relation over the jaw portion of a clip element. In order to lock the boot 44 on the clip element jaw portion, a depression 68 is formed in the channels 66, the depressions 68 being shaped and proportioned for receiving the projections 46, 48 therein. Thus, it is only necessary to push the boot 44 over the lower end or jaw portion of a clip element until the projections 46 and 48 snap within the depressions 68. The boot 44 is then effectively locked in position, and it will be noted tha toe portion 63 thereof extends in a direction toward the toe portion 63 of the boot 44 located on the opposed clip element. The toe portions 63 are thus engaged and define an effective retaining means for locking an article therebetween when the clip elements are located in the normal biased position as illustrated in FIGS. 3 and 4.

In the assembly of the spring clip 10 on a hanger that includes a horizontal rod, it will be assumed that the boots 44 are secured on the jaw portions of the clip elements 22, 24. The spring clip elements 22 and 24 are first positioned such that the rod 14 is located within the slots 38 and 40 of the clip element fingers. In this position, the fingers 34 and 36 of one of the elements is nested within the opposed fingers 34, 36 of the other element. The nesting of the fingers is facilitated by the formation of the concave bearing depressions 42 formed on the fingers. The spring member 50 is then inserted between the clip elements 22, 24 with the arcuate portion 60 overlying the rod 14. The clip element 50 is then urged downwardly until the wings 52 and 54 snap within the channels of the clip elements and the ends 56 and 58 of the spring element wings are in engagement with the marginal end walls 32 of their respective clip elements. With the spring element 50 snapped into position between the clip elements 22 and 24, the spring clip is in the assembled position thereof, and as will be observed in FIGS. 3 and 4, the toe portions 63 of the boots 44 are located in engaging relation and are biased thereto by the spring element 50. If it is necessary to locate an article between the toe portions of each of the clip elements, it is only necessary to depress the handle portions of each of the clip elements to open the jaw portions thereof and insert an article therebetween. It is seen that the spring clips 10 may be disassembled as required by removing the spring element 50 from its assembled position between the spring clip elements 22 and 24. This assembly and disassembly of the spring clip on the rod 14 has particular application in a truss-type hanger 12 as shown in FIG. 1. Thus, each of the spring clips 10 may be assembled in position between the hanger supporting elements 18 and 20, after the hanger 12 has been mounted on its support. The interaction of the opposing fingers 34, 36 of each clip element further acts to lock the clip elements on the rod 14 in the assembled position of the spring clip. Thus, when the clip elements are assembled with the spring element 50, the engaging fingers of the opposed clip elements are rotated toward each other to reduce the slot area of each finger. This overlapping of the fingers which effectively narrows the slots prevents the rod 14 from slipping out of the fingers during the assembly of the spring elements.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a spring clip construction that is adapted to be mounted on a horizontally extending rod, a pair of elongated clip elements, each of which includes a body portion to which marginal edges are joined on three sides thereof to define a channel, a pair of fingers joined to opposed marginal edges of each clip element, each of said fingers being spaced from an adjacent marginal edge to define an open slot therewith, said rod being received within the slots defined by said fingers, a spring element located between said clip elements in engaging relation therewith, said spring element including opposed arms that extend generally outwardly with respect to each other and that terminate in offset end portions, a central arcuate portion being joined to said arms opposite to said offset end portions and having a configuration that generally corresponds to the curvature of said rod, each of said offset end portions being received within the body portion of a clip element and being engageable with a marginal edge thereof to lock said spring element in position, the central arcuate portion of said spring element conforming to the configuration of the rod and snugly fitting thereover in enveloping and engaging relation and cooperating with said opposed arms to maintain said rod in firm position in the slots defined by said fingers.

2. In a spring clip construction as set forth in claim 1, each of the body portions of the clip elements having a jaw portion formed thereon at the end opposite to that which said spring element engages, a boot mounted on each of said jaw portions, each boot being molded in a unitary construction and including a toe portion that projects outwardly for engagement with a similarly formed toe portion on the opposed boot, a slot formed in each boot and defining channels that are located at the edges thereof, said slot and channels receiving the jaw portion of each clip element.

3. In a spring clip construction that is mounted on a horizontal rod and that is adapted to retain an article in suspended position therefrom, a pair of clip elements, each of which includes a body portion that is defined on one end by a handle portion and on the other end by a jaw portion, opposed fingers joined to said body portion intermediate said handle and jaw portions, said fingers projecting in a generally upwardly extending direction and defining open slots into which said rod is received, and a spring removably mounted between said clip elements and overlying said rod to retain said clip elements in biased assembled position on said rod, said spring including opposed arms that are received by the handle portions of each clip element, and a central curved portion joined to said arms, the curvature of said central portion conforming to the configuration of said rod and interfitting thereover in enveloping and engaging relation for retaining said clip elements in biased assembled position on said rod.

4. In a spring clip construction as set forth in claim 3, a boot mounted on the jaw portion of each clip element and including a slot formed therein, the edges of which define channels for receiving the jaw portion of a clip element, a notch being formed in each of the channels and being adapted to receive a projection formed on a marginal wall that is formed as part of the jaw portion of each clip element.

5. In a spring clip construction, a pair of clip elements, each of which includes a handle portion and a jaw portion, spring means for releasably mounting said clip elements on a rod, a boot mounted on the jaw portion of each clip element, said boots being molded in a unitary construction and each including a toe portion that projects outwardly therefrom for engagement with the toe portion of the oppositely located boot, a slot being formed in each boot that includes channels located at the edges thereof, the jaw portion of each clip element having marginal flanges formed thereon that are received in the slot and channels of said boots, a projection formed on a marginal flange of the jaw portion of each clip element, and each of the channels formed in said boots having a notch formed therein for receiving a projection located on the marginal wall of a jaw portion.

(References on following page)

References Cited by the Examiner

UNITED STATES PATENTS

| | | | |
|---|---|---|---|
| 2,569,371 | 9/1951 | Cohen | 24—137 |
| 2,645,013 | 6/1953 | Mathison | 24—262 X |
| 2,666,240 | 1/1954 | Maccaferri | 24—137 |
| 3,032,849 | 5/1962 | Cohn et al. | 24—262 |
| 3,135,034 | 5/1964 | Fauteux | 24—252 |

BOBBY R. GAY, *Examiner.*

WILLIAM FELDMAN, *Primary Examiner.*